(12) United States Patent
Johnston et al.

(10) Patent No.: US 7,146,503 B1
(45) Date of Patent: Dec. 5, 2006

(54) SYSTEM AND METHOD OF WATERMARKING SIGNAL

(75) Inventors: James David Johnston, Morristown, NJ (US); Shyh-Shiaw Kuo, Basking Ridge, NJ (US); Schuyler Reynier Quackenbush, Westfield, NJ (US); William Turin, East Brunswick, NJ (US)

(73) Assignee: AT&T Corp., New York, NY (US)

( * ) Notice: Subject to any disclaimer, the term of this patent is extended or adjusted under 35 U.S.C. 154(b) by 926 days.

(21) Appl. No.: 10/107,083

(22) Filed: Mar. 26, 2002

Related U.S. Application Data (60) Provisional application No. 60/295,727, filed on Jun. 4, 2001.

(51) Int. Cl.
*H04L 9/00* (2006.01)
*H04K 1/02* (2006.01)
*H04N 7/167* (2006.01)

(52) U.S. Cl. ............... 713/176; 380/252; 380/238
(58) Field of Classification Search ........... 713/176; 380/200–201, 218–221, 216, 237–238, 250–252; 382/100, 232; 704/203, 500
See application file for complete search history.

(56) References Cited

U.S. PATENT DOCUMENTS

| | | | | |
|---|---|---|---|---|
| 5,384,811 A * | 1/1995 | Dickopp et al. | ............ | 704/203 |
| 6,219,634 B1 * | 4/2001 | Levine | .................... | 704/200.1 |
| 6,389,574 B1 * | 5/2002 | Belveze et al. | ............. | 714/795 |
| 6,567,780 B1 * | 5/2003 | Rhoads | ....................... | 704/273 |
| 6,674,876 B1 * | 1/2004 | Hannigan et al. | ........... | 382/100 |
| 6,718,309 B1 * | 4/2004 | Selly | .......................... | 704/503 |
| 6,879,652 B1 * | 4/2005 | Srinivasan | ................. | 375/377 |
| 2005/0108542 A1 * | 5/2005 | Kirovski et al. | ............ | 713/176 |

OTHER PUBLICATIONS

Jhung et al., "Architecture of dual mode audio filter for AC-3 and MPEG", Jun. 13, 1997, IEEE, pp. 575-585.*
"Analysis of Attacks on SDMU Audio Watermarks," by M. Wu, et al. *ICASSP Proceedings, vol. III of VI Image & Multidimensional Signal Processing, Multimedia Signal Processing,* May 7-11, 2001, Salt Lake City, Utah, USA.
"Advanced Watermarking and Its Applications," by C. Neubauer, et al., 109th *AES Convention,* Los Angeles, Sep. 2000.
"MPEG Audio Coding" by J. Johnston, et al., in *Wavelet, Subband and Block Transforms in Communications and Multimedia* (A. N. Akansu and M. J. Medley, eds.) Ch. 7, pp. 207-253, Kluwer Academic Publishers, 1999.
"Psycho-acoustics, Facts and Models", by E. Zwicker and H. Fastl, Springer, 2 ed., 1999.
"Digital Watermarks for Audio Signals," by L. Boney, et al., *IEEE Int. Conf. on Multimedia Computing and Systems,* Hiroshima, Japan, pp. 470-480, 1996.
"Echo Hiding," by D. Gruhl, et al., *Proceedings of the Workshop on Information Hiding,* First International Workshop, Cambridge, U.K., Springer-Verlag, May/June, 1996.
"Digital Communications," by J. G. Proakis, McGraw-Hill, 1983.

* cited by examiner

*Primary Examiner*—Gilberto Barrón, Jr.
*Assistant Examiner*—Minh Dieu Nguyen (57) ABSTRACT

A system and method of generating a watermarked signal are disclosed. The system segments the signal into overlapping blocks using a window function and processes the overlapping blocks according to whether each block is odd- or even-numbered. The system windows the odd-numbered blocks, modulates the phase of each block in the frequency domain, transforms each modulated block in the time domain, windows each block transformed into the time domain and overlap-adds each odd-numbered block with each even-numbered block to generate the watermarked signal.

29 Claims, 6 Drawing Sheets

Fig. 1c
fc=1kHz, fm=30Hz, phase=180°

Fig. 1d
fc=1kHz, fm=30Hz, phase=180°

Fig. 1e
fc=1kHz, fm=500Hz, phase=180°

Fig. 1f
fc=1kHz, fm=500Hz, phase=180°

Fig. 1g
fc=1kHz, fm=30Hz, phase=15°

Fig. 1h
fc=1kHz, fm=30Hz, phase=15°

SYSTEM AND METHOD OF WATERMARKING SIGNAL

PRIORITY APPLICATION/RELATED APPLICATION

The present application claims the benefit of Provisional Patent Application No. 60/295,727, filed Jun. 4, 2001, the contents of which are incorporated herein by reference. The present application is related to Ser. No. 10/107,017, entitled "System and Method of Retrieving a Watermark Within a Signal" filed on the same day as the present application and the contents of which are incorporated herein by reference.

BACKGROUND OF THE INVENTION

1. Field of the Invention

The present invention relates to preventing copying of digital data and more specifically to a system and method of embedding a low-rate watermark into a signal.

2. Discussion of Related Art

Digital Watermarking offers means to embed some additional hidden data into a host audiovisual signal in such a way that the resulting watermarked signal and the host signal are perceptually identical. Although a wide range of applications can benefit from this technology, watermarking methods have drawn much attention recently due to the rapid development of intellectual property rights protection issues. A typical watermarking algorithm embeds a watermark by adding noise patterns or echos to an original audiovisual signal such that the watermark is not perceptible but can be retrieved by using a correlation type of methods. In order to make these methods more robust in retrieval and pirate attacks, a stronger noise pattern or large echo has to be used. Unfortunately, the stronger noise pattern or large echo causes audible distortion in the resulting watermarked signal as well, which is not acceptable. Therefore, this tradeoff limits the robustness of these methods and makes them sensitive to other noises and distortions generated in the process following the watermarking operation, such as coding.

Some known methods may exploit the long- or short-term, temporal or spectral masking effects of the Human Auditory System ("HAS"). Literature such as W. Yost's "Fundamentals of Hearing, an Introduction" (Academic Press, New York) describe the HAS. However, since most modern audio compression algorithms also take full advantage of these same characteristics, those perceptually shaped watermarks (noise patterns or echos) may in fact be damaged by an advanced perceptual coder or at least their margins of exploiting masking effects may become limited.

Most watermarking methods available today are also called "blind" watermarking which means that the embedded watermark can be retrieved from the watermarked signal without requiting access to the unwatermarked original. This convenience makes them useful for carrying descriptive information associated with the actual audio contents, such as title, composer and players etc. However, since they are usually vulnerable to attacks as explained above, they are not good candidates for intellectual property protection.

What is needed in the art is a system and method for covert (or non-blind) digital audio watermarking.

SUMMARY OF THE INVENTION

The present invention addresses the deficiencies of the prior art and provides a system and method for covert digital audio watermarking. The invention is primarily described in terms of digital audio signals but may be applied to any signal.

According to an embodiment of the invention, a method is provided for generating a watermarked signal. Preferably, a computer system practices the method according to a software program comprising functional instructions to control the operation of the computer system. Those of skill in the art will understand the various computer systems capable of processing the methods disclosed herein. The system receives the signal as an input and segments the signal into overlapping blocks $s_k(n)$, $n=0, \ldots, N-1$ using a window function. Any known window function may be used.

The system processes odd- and even-numbered blocks differently. For odd-numbered blocks, the system windows each block using the window function to generate blocks $s^*_k(n)$. For even-numbered blocks, in the frequency domain, the system embeds a message bit into every integer bark scale bin for each even-numbered block $S_k(f)$. The terms "odd-" and "even-" numbered blocks are only used for convenience and may be interchangeable. In other words, the system may embed the message bits in the bark scale bins for the odd-numbered blocks. The selection of processing for the odd- and even-numbered blocks is for convenience only.

Continuing with the processing of the even-numbered blocks, the phase modulation for the k-th block is $\Phi_k(b) = \Sigma a_t \theta(b-t)$, $0.0 \leq b \leq I$, where $b=13 \arctan(0.76f/1000)+3.5 \arctan((f/7500)^2)$ and where the resulting signal for each even-numbered block is $S_k(f)=S_k(f) \cdot e^{j\Phi_k(f)}$, $f=0, \ldots, N-1$. In the time domain, the system windows the phase-modulated block to generate $s^*_k(n)$.

The system overlaps and adds $s^*_k(n)$ and $s^*_k(n)$ to form the watermarked signal. The embedded watermark is very difficult to recover without the original unmodulated signal. Thus, the covert watermark is only retrievable by the one who owns the unwatermarked signal.

BRIEF DESCRIPTION OF THE DRAWINGS

The foregoing advantages of the present invention will be apparent from the following detailed description of several embodiments of the invention with reference to the corresponding accompanying drawings, in which.

DETAILED DESCRIPTION OF THE INVENTION

The system and method according to the present invention addresses the vulnerabilities of the related art. The method embeds watermark information via slowly varying phase shift both in time and frequency. The watermark data rate is preferably around 20–30 bits/s, but other data rates are contemplated as within the scope of the invention. The exact rate depends on the nature of the audio signal and the level of desirable robustness. The embedded watermark is perceptually transparent and can be retrieved by a robust algorithm even when some non-linear, noise-inserting process, such as coding, significantly damages the watermarked signal. It is also possible to recover the watermark in the presence of stationary phase or amplitude distortion.

Any computer device may practice the present invention. The present invention is not limited in any manner to a specific system, computer configuration or means for storing or transmitting media data.

The method of the present invention is particularly useful for applications in intellectual property protection, such as proving ownership of music and tracing the source of illegal copies. For example, a music label owner desires to sell music to a buyer. He or she can first use this method to embed any unique secret ID number of the buyer into the music. The seller transmits the watermarked music to the buyer using any coding methods (such as MP3 or AAC) and via any media (such as internet or CD). If it happens that the buyer makes illegal copies of the music, then the owner uses the method according to the present invention to prove that the pirated copy of the music label originated from this particular buyer.

In addition, the music label owner can also embed a unique ID number into the music. If other people claim ownership of the music, retrieving the unique ID enables the owner to prove true ownership of the music. The algorithm makes the embedded watermark very difficult to recover without the original, unmodulated signal. This covert nature is a desirable property in these applications, since it makes an unauthorized user unable to extract or confirm the existence of a watermark even if he or she knows that the audio signal may contain a watermark and knows very well the algorithm that embeds it. This covert property makes the proposed algorithm an excellent complementary partner to those blind watermarking techniques.

The watermark embedded by blind watermarking can be retrieved and displayed at the user's computer device without requiring the original. The watermarking according to the present invention can be used to convey descriptive information of the actual audio contents and even a warning message indicating that the music (or any signal) is copyright protected by a covert watermark. This covert watermark is embedded by the proposed algorithm and is only retrievable by the one who has the access to the unwatermarked original. The advantages of the invention discussed herein are in no way meant to add functional limitations to the scope of the claims.

A watermarking method is a valuable supplement to an encryption system. An encrypted audio signal becomes very vulnerable for illegal copies after it is decoded. However, if the audio signal was also watermarked, then the decoded signal still contains the watermark that cannot be eliminated by simply decoding and coding again of the signal.

Figure 1A:
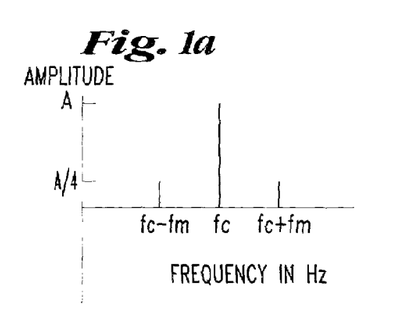
FIGS. 1(a)–1(h) illustrate various frequency and time samples of signals to demonstrate similar and different envelopes for differently processed signals.
Figure 1B:
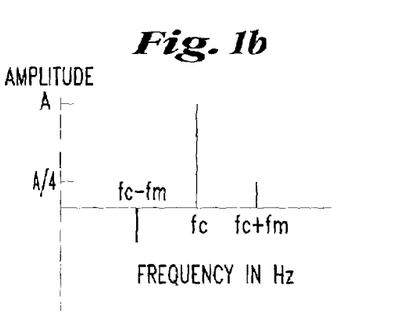
Figure 1C:
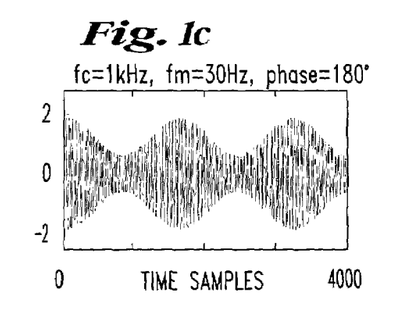
Figure 1D:
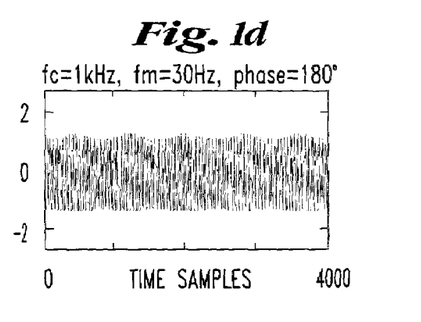
Figure 1E:
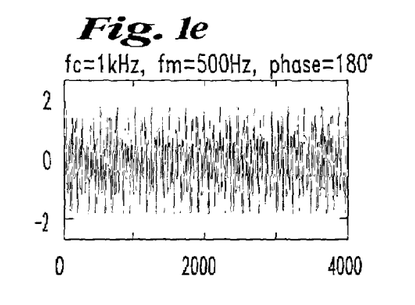
Figure 1F:
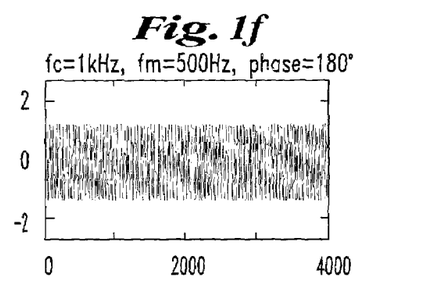
Figure 1G:
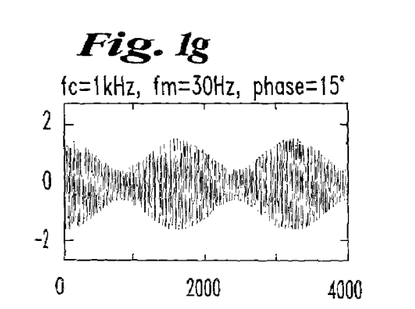
Figure 1H:
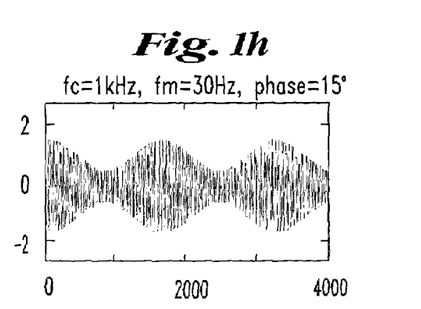

A phase-altered audio signal may sound different from its original signal, and the audibility of the difference depends on the changes in the envelope. That is, the difference won't be audible if the envelopes of the two signals are similar. For example, the spectra of two signals are shown in FIGS. 1(a) and 1(b). These figures illustrate the spectra for a carrier frequency $f_c$ of 1000 Hz and the sidebands associated with the modulation frequency $f_m$ of 30 Hz. The signals each have exactly the same spectrum amplitudes, but one of the side bands of the signal in FIG. 1(b) has a phase shifted by 180° with respect to its counter part side band in FIG. 1(a). FIGS. 1(c) and 1(d) illustrate the waveforms of the two signals, illustrating how different the signals sound. However, if the modulation frequency $f_m$ is greater than one critical band (the corresponding waveforms are shown in FIGS. 1(e) and 1(f) for a modulation frequency $f_m$ of 500 Hz), then the difference between the two signals becomes in-audible. On the other hand, if the phase difference between FIG. 1(a) and 1(b) is 15° instead of 180° (the corresponding waveforms are shown in FIG. 1(g) and 1(h)), then the difference between the two signals is in-audible.

Figure 2:
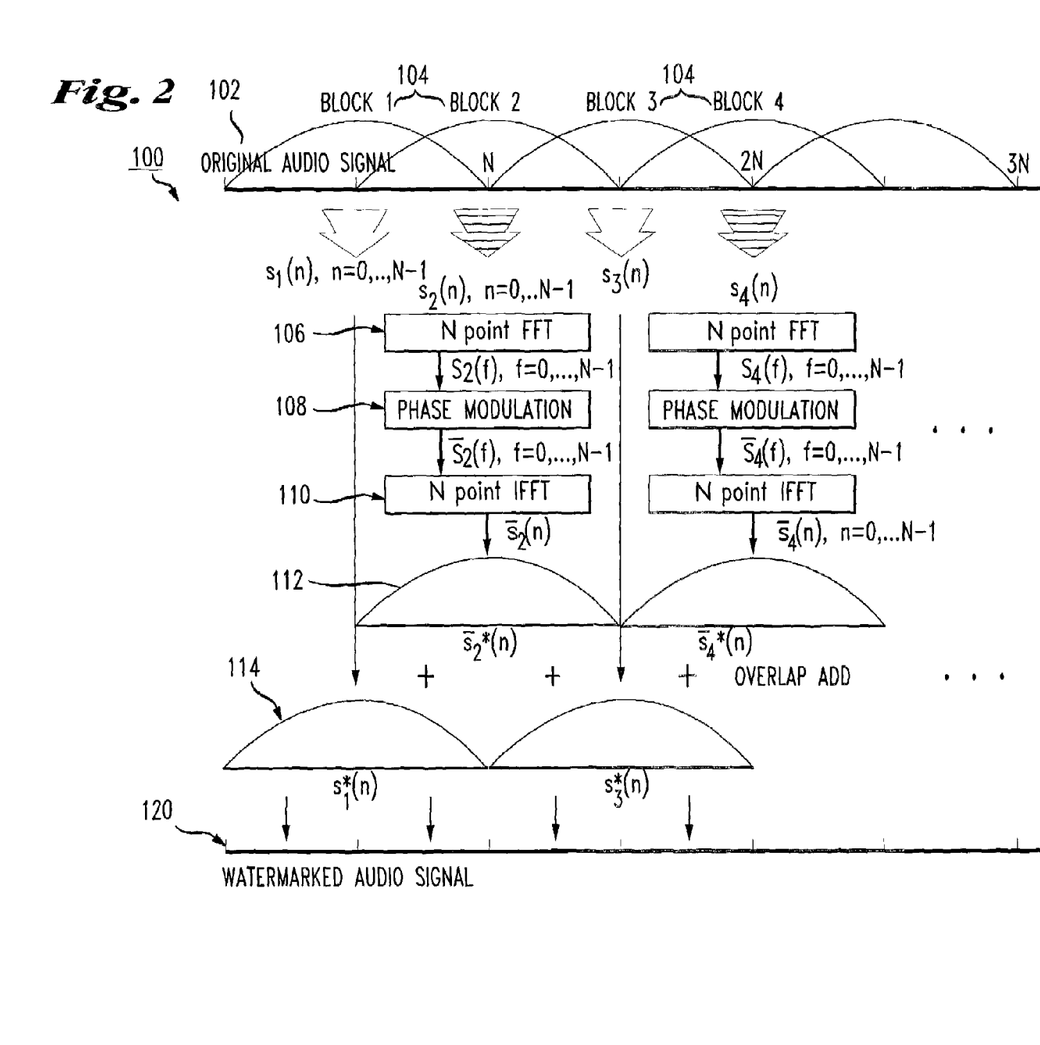
FIG. 2 illustrates a method according to an embodiment of the invention for using long-term phase modulation to perform watermarking of a signal.

By using the above observations, the system can embed a watermark into an audio signal using properly controlled phase modulation such that the watermark is not audible but is detectable. FIG. 2 shows an exemplary method 100 of watermarking a signal. The method is shown as related to an audio signal but the invention is not limited to any particular signal.

First, the system segments the original audio signal 102 into long blocks 104 using overlapping windows. Windowing is a simple multiplication between win(n) and $s_k(n)$. That is, $s^*_k(n)=win(n) \cdot s_k(n)$ for $0 \leq n \leq N-1$. Each block contains N samples. In a preferable embodiment of the invention, N is intended to be quite large, for example $2^{14}$. However, the fundamental features of the present invention do not relate to any particular range of values for N.

The window function used for segmenting the signal 102 into blocks is as follows:

$$win(n)=\sin((\pi(n+0.5))/N),\ 0 \leq n \leq N-1 \qquad (1)$$

The system embeds the watermark in every other block for the purpose of retrievability, explained below. In other words, for each odd block, the windowed signal $s_k(n)$ is again windowed by the same function Equation (1). The resulting blocks $s^*_k(n)$ 114 are ready for the overlap-add construction of the watermarked signal 120. The system transforms each even block into the frequency domain 106 to produce $S_k(f)$, and then phase modulates 108 each block of the frequency domain to generate $\overline{S}_k(f)$. The system transforms the phase modulated block $\overline{S}_k(f)$ into the time domain 110 to generate $\overline{s}_k(n)$. The system windows $\overline{s}_k(n)$ in the time domain to generate $\overline{s}^*_k(n)$.

The system overlap-adds $\overline{s}^*_k(n)$(k even integers) 112 and $s^*_k(n)$ (k=odd integers), the adjacent non-watermarked blocks 114, to construct the watermarked audio signal 120.

For a multi-channel audio signal, the system applies the same phase modulation to all channels. Although it is more efficient to have each channel embed different parts of the watermark, this may cause a stereo imaging effect and make the watermark audible.

The phase modulation 108 in FIG. 2 is implemented by obeying the following rule so that the resulting envelope change in the signal is very small and therefore not audible:

$$|(d\phi/db)|<30 \qquad (2)$$

where ø denotes the signal phase and b indicates the bark scale which is a standard scale of frequency. Each bark constitutes one critical bandwidth. The bark scale is often used as a frequency scale over which masking phenomenon and the shapes of cochlea filters are invariant. This audibility rule represents the optimal ratio of signal phase and bark scale to assure that the watermark in the signal is inaudible. There may be other audible ranges to this rule or other parameters or equations that may be developed as comparable audible rules and these concepts are considered within the scope of the present invention.

A convenient and good approximation for conversion of frequency between bark and Hz is given by:

$$b=13 \arctan(0.76f/1000)+3.5 \arctan((f/7500)^2) \quad (3)$$

where f is frequency in Hz. Equation 2 basically constraints the phase change inside a critical band to be small enough so that it won't cause an audible envelope change of the time signal. Note that the phase change over time has to be very slow as well. That is, if the block size N is too small, then the envelope change between two adjacent blocks may become audible. Although the phase change can be adapted to a smaller dynamic range (e.g., 15° is used in Equation (2) instead of 30°) for a shorter block size, the watermark will become difficult to be retrieved accurately. Therefore, in an exemplary aspect of the invention, a long block size ($N=2^{14}$) is preferred.

Figure 3A:
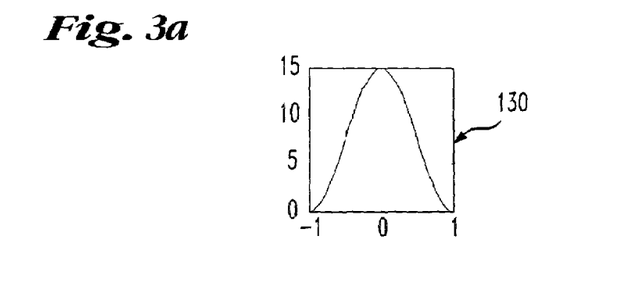
FIGS. 3(a)–3(c) illustrate the portion of the watermark that will be embedded in the k-th block of the signal.
Figure 3B:
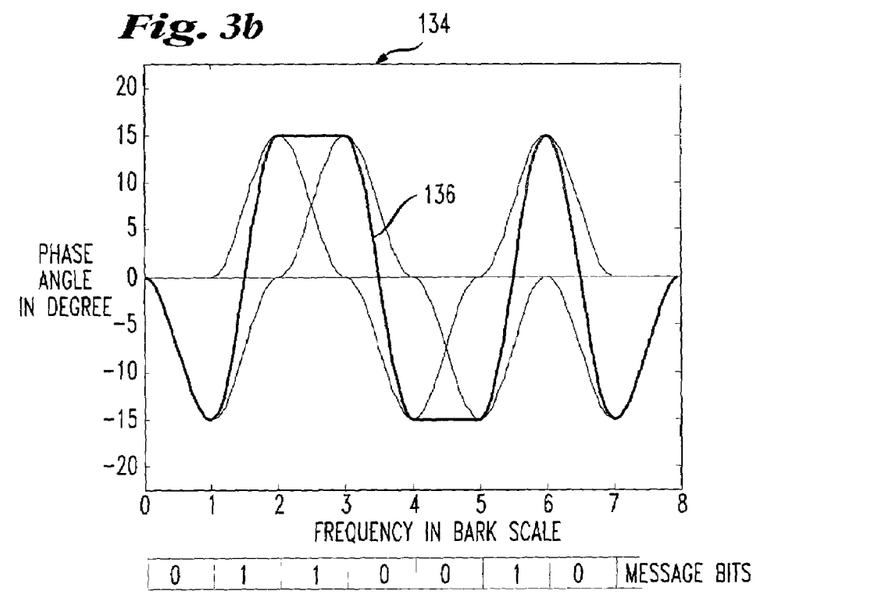
Figure 3C:
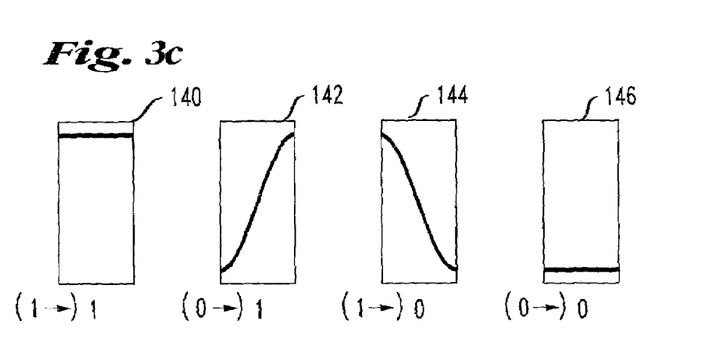

The watermark is translated into phase modulation by having every one integer bark scale carry one message bit of the watermark. Supposing the message bits of the watermark are a combination of 0's and 1's, FIGS. 3(a)–3(c) show the part of watermark which is to be embedded in the k-th block of the audio signal and how they are translated into the phase modulation for the block. As shown in FIG. 3(a), each message bit is represented by a phase window function 130 that centers at the end of the corresponding bark band and spans two adjacent barks. The phase window function shown in FIG. 3(a) is defined as:

$$\varphi(b)=\sin^2((\pi(b+1))/2), -1.0 \leq b \leq 1.0 \quad (4)$$

Denote as $a_1, a_2, \ldots, a_I$ the sequence of bits representing the part of the watermark to be embedded in this k-th audio block. The corresponding phase modulation for this block can be expressed as:

$$\Phi_k(b) = \sum_{i=1}^{I} a_i \phi(b-i), -1.0 \leq b < I \quad (5)$$

where I is the maximum bark scale for embedding watermark. According to this equation, the system overlaps and adds adjacent window functions so that the final phase modulation 136 in the i-th bark scale bin takes the form of:

$$\Phi_k(b)=a_{i-1}\varphi(b-(i-1))+a_i\varphi(b-i), \text{ for } i-1 \leq b < i \quad (6)$$

as shown in the graph 134 of FIG. 3(b).

The system alters the phases of the k-th audio block according to the $\Phi_k(b)$ obtained from Equation (5). This operation is carried out in the phase modulation step shown in FIG. 2. In other words, the system modifies the $S_k(f)$ blocks in FIG. 2 as follows:

$$\overline{S}_k(f)e^{j\Phi_k(f)}, f=0, \ldots, N-1, k=2, 4, \ldots \text{ even integers} \quad (7)$$

Note that the index f indicates the frequency bin in Hz, and their relationship to bark scale is given by Equation (3). The resulting watermarked audio signal sounds identical to its original form, and it is ready for processing by other procedures, such as coding. It will be shown below that the system can retrieve the embedded watermark from the processed version.

In order to increase the robustness of the algorithm and the accuracy of the retrieved watermark, adding redundancy to the embedded message bits is desirable. The simplest way is just to repeat every message bit as is done in many watermark algorithms. This redundancy enhances the robustness of the watermark retrieval by reducing the noise via averaging over repeated observations. As shown below, this technique helps to increase retrieval accuracy. However, a preferable way for the present invention is to increase the dynamic range of the phase modulation, while at the same time maintaining the inaudible rule for the phase manipulation, Equation (2). This can be accomplished by having m barks carry one message bit, i.e., the phase window function, Equation (4), is modified as:

$$\varphi(b)=\sin^2((\pi(b+m)/(2m)), -m \leq b \leq m, \quad (8)$$

For the case shown by FIGS. 3(a)–3(c) and Equation (4), the dynamic range of the phase modulation is +/−15°. By having m barks carry one message bit, the dynamic range of the phase modulation can be increased to +/−15°·m while maintaining the rule of Equation (2). The bigger the m, the larger the dynamic range, the more robust the algorithm, but of course the lower the data rate of the watermark. In addition, as shown below, the robustness of the algorithm can be further improved by incorporating some error-control code as shown by J. G. Proakis, *Digital Communications*, McGraw-Hill, 1983.

FIG. 3(c) illustrates $\Phi_k(f)$ as a concatenation of the four possible transitions 140, 142, 144, 146. The system determines the shape of each transition by the unique message bit (0 or 1) it represents and the one ahead of the current message bit.

The data rate of the watermark depends on three factors: the amount of redundancy added, the frequency range used for embedding the watermark, and the energy distribution of the audio signal. If the energy in a bark band is too low, then the bark band should not carry a message bit. Since a very long windowed block is adopted in the algorithm, energy is averaged over a long period of time (another good reason for using long windowed blocks). Hence, for most music or other signal samples, not many blocks contain bark bands that have insufficient energy to carry the message bit. This energy detection mechanism according to an aspect of the present invention is also useful in identifying and skipping silence blocks. For high quality audio sampled at 44.1 kHz, 0 to 15 kHz is an exemplary range for embedding a watermark, which is equivalent to a 0–24 bark scale. And if the redundancy factor, m in Equation (8), is equal to 2, then the data rate of the watermark is about $(24/2)/(2^{14}/44100)$ =32 b/sec.

One interesting observation of the present invention is that if consecutive watermarking procedures are carried out on a piece of music or a signal, then any two adjacent watermarked results will sound identical but any others will sound different. For instance, watermarking A results in B, and then watermarking B results in C. A and B will sound identical and so will B and C since each pair obeys the inaudible rule of Equation (2). However, A and C may sound different, since the phase difference between them may violate the rule.

Watermark retrieval is described next. The process of retrieving the watermark from a watermarked signal exemplifies another embodiment of the invention. The two processes of watermarking and retrieval are independent of one another. For example, the retrieval process is described herein for the purpose of retrieving the embedded watermark within a signal, but is not limited to retrieving that specific embedded signal. In other words, the retrieval process may be used to retrieve any kind of signal embedded within another signal. For example, noise or other signal damage may be retrieved from a given signal using the retrieval process disclosed herein. Similarly, the embedding process is completely independent of the retrieval process.

Figure 4:
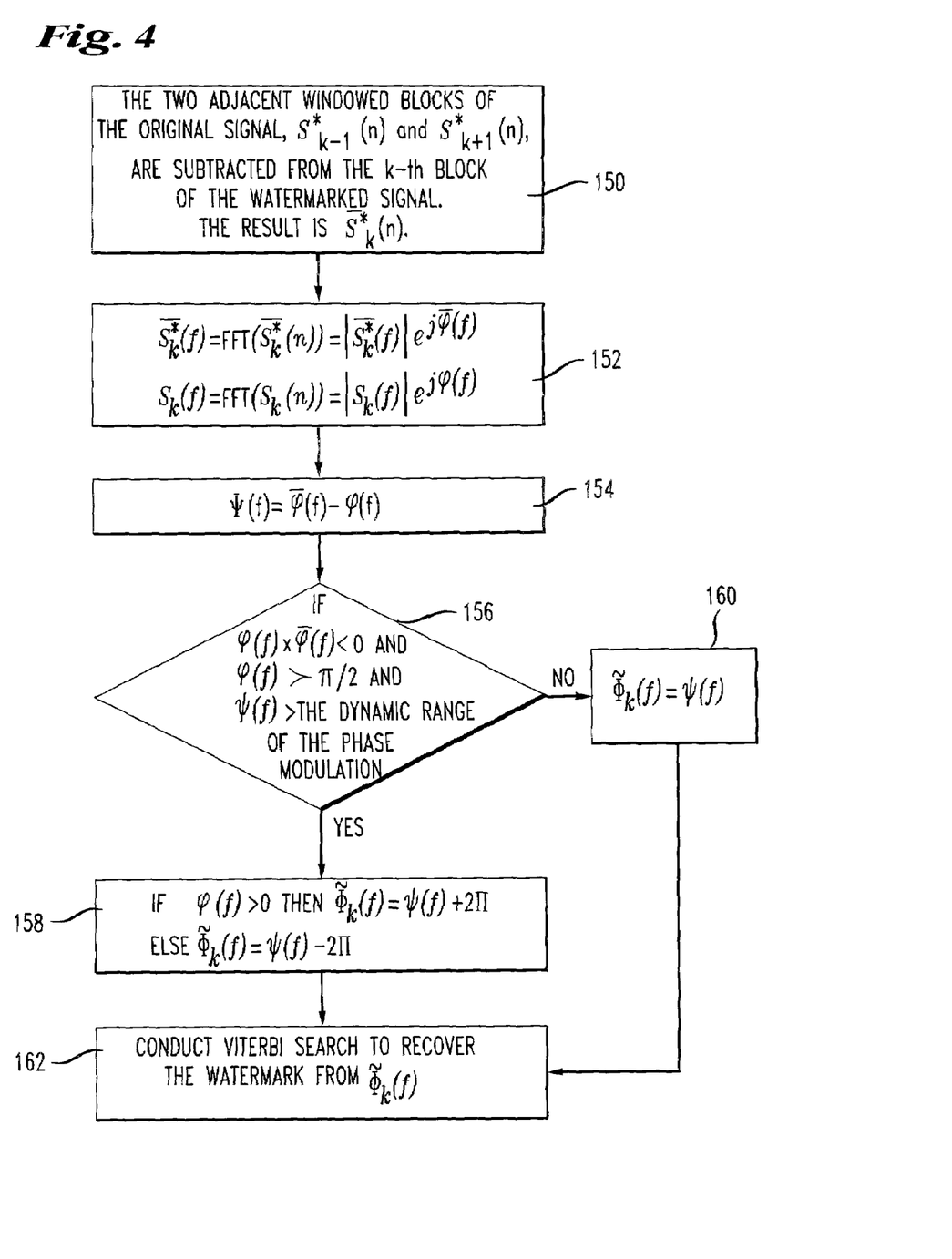
FIG. 4 is an exemplary method for retrieving the watermark in a watermarked signal according to an aspect of the present invention.

The system can retrieve the embedded watermark even when some non-linear, noise-inserting process like coding seriously affects the watermarked audio signal. The system carries out an inverse operation of the watermarking procedure shown in FIG. 2 to retrieve the phase modulation applied to the original signal. The process is illustrated in FIG. 4. For the k-th block of the audio signal, the result is denoted as $\tilde{\Phi}_k(f)$ in Equation (7). It is a noisy version of its original form, $\Phi_k(f)$ in Equation (7). Therefore a Viterbi decoding procedure is conducted to retrieve the watermark embedded in $\tilde{\Phi}_k(f)$. The retrieval procedure is preferably applied on a block-by-block basis for each even-numbered block of a signal, say the k-th block. The procedure is repeated for every even block of the audio signal in order to recover the entire embedded watermark.

In addition, if the watermarked signal has been clipped or inserted, then a proper alignment operation such as cross-correlation should also be carried out between the original signal and the watermarked signal on a block-by-block basis. Since a typical watermark is short and can be repeatedly embedded, it is very likely that the watermark can still be successfully retrieved from a short excerpt of the watermarked signal.

The retrieved phase modulation, $\tilde{\Phi}_k(f)$, is obtained by using the original audio signal and the watermarked audio signal. Based on FIG. 2, the phase modulation for the k-th block can be recovered by comparing $S_k(f)$ with $\overline{S}_k(f)$. $S_k(f)$ can be easily recalculated from the original audio signal. The values of $\overline{S}_k(f)$ can be obtained by first undoing the overlap-add operation shown in FIG. 2.

That is, the two adjacent windowed blocks of the original signal, $s^*_{k-1}(n)$ and $s^{*k+1}(n)$, are subtracted from the k-th block of the watermarked signal (150). This results in the retrieved $\overline{s}^*_k(n)$. It should become clear at this point that if a watermark is embedded in every block instead of every other block as implemented, then $\overline{s}^*_k(n)$ would be very difficult to recover. In order to obtain the phase-modulated block $\overline{s}_k(n)$, an inverse windowing may be applied to the retrieved $\overline{s}^*_k(n)$. However, in the preferred embodiment of the invention, this operation is eliminated because it may cause significant noise amplification around the block boundaries. Accordingly, preferably, the system directly performs a fast Fourier transform on the retrieved $\overline{s}^*_k(n)$ (152). The phases of the result $\overline{S}^*_k(f)$ and $S_k(f)$ are calculated and denoted as $\overline{\phi}(f)$ and $\phi(f)$, respectively. The system calculates and defines their difference (154) as:

$$\Psi(f)=\overline{\phi}(f)-\phi(f)$$

Ideally, $\Psi(f)$ is the desired phase modulation $\tilde{\Phi}_k(f)$ for the watermark (160). However, in the phase modulation stage shown in FIG. 2, after adding the phase modulation $\phi(f)$ to the phase of the original signal, the result would be wrapped into its $2\pi$ complement if its absolute value was greater than $\pi$. In this case, the corresponding $\overline{\phi}(f)$ and $\phi(f)$ would have opposite sign (156), and $\Psi(f)$ has to be unwrapped (+2$\pi$ or -2$\pi$)(158) to get the correct $\tilde{\Phi}_k(f)$.

Figure 5:
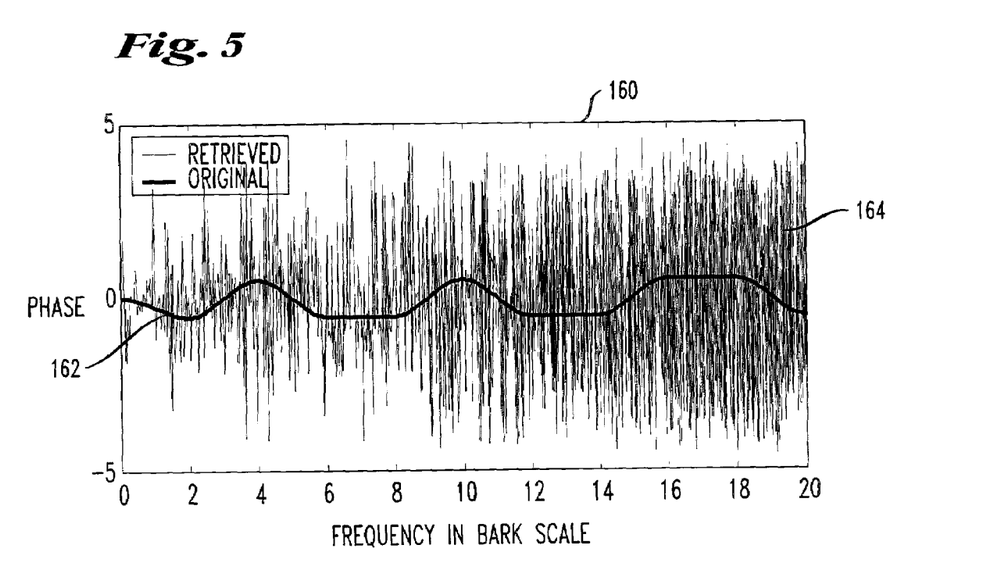
FIG. 5 illustrates a comparison between the original signal and the retrieved signal.

In addition, according to the preferred embodiment of the invention, by taking noise into consideration, this unwrapping operation only occurs when $\phi(f)>\pi/2$ (156) and when $\Psi(f)$ is greater than the dynamic range of the phase modulation (156). The unwrapping results in the retrieved phase modulation $\tilde{\Phi}_k(f)$ that is the best estimate of the original phase modulation $\Phi_k(f)$. It becomes clear now that the present invention is a covert watermark method since the original un-modulated signal is required in order to retrieve $\Phi_k(f)$ and then to recover the watermark embedded in it. FIG. 5 provides an example graph 166 of an original phase modulation $\Phi_k(f)$ 162 and its retrieved version $\tilde{\Phi}_k(f)$ 164. Coding the watermarked audio signal using MPEG AAC at 64 kb/s causes the noisy signal $\tilde{\Phi}_k(f)$.

Figure 6:
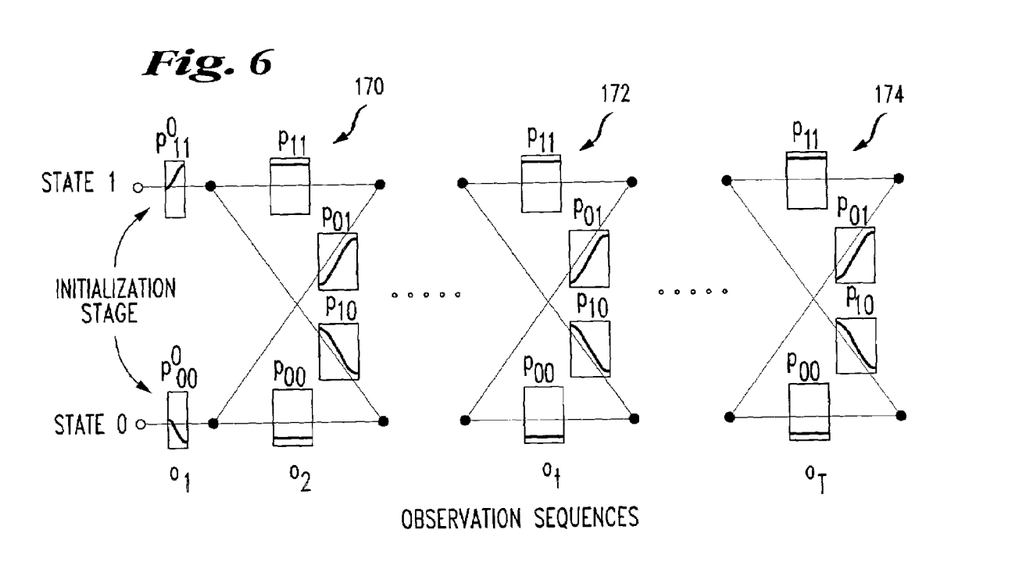
FIG. 6 illustrates the operation of the Viterbi trellis.

A Viterbi search provides the preferred method of identifying the watermark embedded in the noisy retrieved phase modulation $\tilde{\Phi}_k(f)$ (162). As shown FIG. 3, the final phase modulation $\Phi_k(f)$ can be simply viewed as a concatenation of the four possible transitions shown in FIG. 3(c). Each transition in FIG. 3(c) represents a unique message bit (0 or 1). If there is no noise (i.e., no processing applied to the watermarked signal), then the retrieved phase modulation $\tilde{\Phi}_k(f)$ will be identical to $\Phi_k(f)$. Hence, each message bit embedded in $\tilde{\Phi}_k(f)$ can be easily identified one-by-one by matching the corresponding segment of $\tilde{\Phi}_k(f)$ with those in FIG. 3(c). However, since the retrieved phase modulation $\tilde{\Phi}_k(f)$ is noisy, it is preferable to find a single best concatenated sequence of those shown in FIG. 3(c) in such a way that the sequence is the best match for the given $\tilde{\Phi}_k(f)$. In other words, instead of making a hard decision for each message bit embedded in $\tilde{\Phi}_k(f)$ on an one-by-one basis, the system only makes one final decision of the single best sequence until the entire observation $\tilde{\Phi}_k(f)$ has been taken into account. This naturally leads to the Viterbi search algorithm. As shown in FIG. 6, the two possible values of the message bit, 0 and 1, constitute the two states. The shapes of phase modulation (FIG. 3(c)) associated with each transition path between the two states are also shown in the Figure, which are denoted as path templates. Since every m barks carries one watermark message bit, the corresponding samples of $\tilde{\Phi}_k(f)$ for every m barks constitute an observation sequence $o_t$. Hence, if m=2 and 24 barks are used to carry the watermark, then we have 12 such sequences (i.e., T=12 in FIG. 6). If there is no noise, the observation sequence $o_t$ will be identical to one of the four possible path templates shown in FIG. 6. Since our observation sequences $o_t$ are very noisy, the goal of the Viterbi search is to find a single best state sequence $q=(q_1 \ldots q_t \ldots q_T)$ which is the best match for the given observation sequence $o=(o_1 \ldots o_t \ldots o_T)$.

Theoretically, the watermark recovered from the noisy retrieved phase modulation $\tilde{\Phi}_k(f)$ using the Viterbi search is an optimum solution. Because according to equation 6, the phase modulation $\Phi_k(f)$ depends only on two adjacent bits which satisfies Markovian property, it is assumed that the message bits are independent and identically distributed.

Since an effective form of the cost function used in the Viterbi search plays the major role in the success of the search, this disclosure first defines a cost function, and then provides the complete search procedure. As observed from FIG. 5, one main characteristic of the retrieved phase modulation $\Phi_k(f)$ 164 is that it contains many outliers. Outliers are atypical (by definition), infrequent observations: data points which do not appear to follow the characteristic distribution of the rest of the data. These may reflect genuine properties of the underlying phenomenon (variable), or may be due to measurement errors or other anomalies that should not be modeled. From the data modeling point of view, $L_1$ norm (mean absolute error) is much more robust than the commonly used $L_2$ norm (mean square error) for fitting data with outliers. As shown below, better results were obtained by using the energy weighted $L_1$ norm to calculate the cost of taking a particular path between state i and j for an observation $o_t$. The cost function is defined as follows:

$$c_{ij}(t) = \frac{1}{K} \sum_{f=0}^{K-1} \left| \sum_c (p_{ij}(f) - o_t(f))w_t(f) \right|, \quad (9)$$

$$\text{for} \begin{pmatrix} 0 \le i, & j \le 1 \\ 1 \le t \le T, & \end{pmatrix}$$

where $p_{ij}(f)$ is the path template between states i and j, K is the total number of frequency bins associated with the observation $o_t$, and $w_t(f)$ are the weights which are based on the spectrum energy and are defined as:

$$w_t(f) = \min(|S'(f)|^2, |\overline{S}'_c(f)|^2), \text{ for } f = 0, \ldots, K-1 \quad (10)$$

$$\sum_f w_t(f) = 1$$

If S(f) is the FFT of a windowed block of the original audio signal as shown in FIG. 2 and Equation (7), then S'(f) indicates the portion of S(f) that corresponds to $o_t(f)$. Similarly, if $\overline{S}(f)$ is the FFT of a windowed block of the watermarked signal which is the $\overline{s}^*_k(f)$ in FIG. 2, then $\overline{S}'(f)$ indicates the portion of $\overline{S}$(f) that corresponds to $o_t(f)$. Note that each of the four path templates $p_{ij}(f)$, shown in FIG. 6, in fact has different length at each observation stage t, although their shapes are exactly the same in bark scale. This is because a high bark covers a bigger frequency range than a low bark. This can be easily realized from the relationship between bark and Hz given in Equation (3). For simplicity, this disclosure does not use different notations to distinguish the length difference of $p_{ij}(f)$.

The spectrum energy associated with each frequency bin f also significantly impacts the effectiveness of the cost function, Equation (9). For regions in the spectrum that have high energy, since they often possess a high signal-to-noise ratio, the phase modulation information embedded there has a much better chance to survive or to be less distorted. In addition, the long FFT window used in the algorithm (FIG. 2) provides a nice averaging effect over a long period of time. For high energy spectrum regions, even though the phase information is distorted in some portion of the long time window, other portions of the window may still carry the information and can contribute to the final result obtained from the entire long window. Therefore, these regions with high spectrum energy should have more significance (weight) in evaluating the cost, as shown in Equation (9). Moreover, as shown in Equation (10), the spectrum energies of both the original and the watermarked audio signals are taken into consideration and the smaller one is picked. This is because some energy components may be dramatically changed due to the processing applied to the watermarked signal. For instance, the perceptual model used in MEPG AAC may completely eliminate some spectrum components due to their perceptual irrelevancy, which will result in significant energy reduction and phase information distortion. Hence, this reduced energy should be chosen as the weight.

For a multi-channel signal, since the same watermark is embedded into each channel, the cost should be jointly evaluated across all channels to take advantage of this extra available information. Hence, the cost function for a multi-channel signal is modified accordingly as follows:

$$c_{ij}(t) = \frac{1}{K} \sum_{f=0}^{K-1} \left| \sum_c (p_{ij}(f) - o_{t,c}(f))w_{t,c}(f) \right|, \quad (11)$$

$$\text{for} \begin{pmatrix} 0 \le i, & j \le 1 \\ 1 \le t \le T, & \end{pmatrix}$$

$$\sum_f \sum_c w_{t,c}(f) = 1$$

The complete Viterbi search procedure can now be presented. The goal is to find a single best state sequence $q=(q_1 \ldots q_t \ldots q_T)$ which has the minimum cost for the given observation sequence $o=(o_1 \ldots o_t \ldots o_T)$. In order to actually retrieve the state sequence, the system uses the array $\gamma_t(j)$ to keep track of the argument that minimizes the cost for each observation t and each state j. The system initializes the procedure by calculating the cost (using Equation (9) or (11)) of matching $o_1$ with $p^0_{00}$ and $p^0_{11}$ as shown in FIG. 6. The results are denoted as $c_{00}$ and $c_{11}$, respectively.

1. Initialization $C_1(i)=c_{ii}$, $i=0, 1$ $\gamma_t(i)=0$.

2. Recursion $$C_i(j) = \min_{i=1,2}[C_{t-1}(i) + c_{ij}(t)], 2 \le t \le T, j = -0, 2 \le t \le T, j = -0, 1$$

$$\gamma_i(j) = \operatorname*{argmin}_{i=1,2}[C_{t-1}(i) + c_{ij}(t)], 2 \le t \le T, j = -0, 2 \le t \le T$$

3. Termination $$C^* = \min_{i=0,1}[C_T(i)]$$

$$q_T = \operatorname*{argmin}_{i=0,1}[C_T(i)]$$

4. Path (state sequence) backtracking $q_t = \gamma_{t+1}(q_{t+1})$, $t=T-1, T-2, \ldots, 1$.

Note that C* in the termination step is the minimum total cost associated with the best state sequence q.

As discussed above, in order to increase the robustness of the algorithm and the accuracy of the retrieved watermark, the message should be redundant. Since any addition of redundancy can be called a channel coding, strictly speaking, the introduction of redundancy above is a type of channel coding, because, in the absence of signal distortion, even one sample can carry the whole message and not having multiband to carry one message bit. The encoding of using repeated message bits is a form of repetition code.

The theory of error-control coding presents encoding algorithms in an optimal way such that, for the same amount of redundancy, the decoded bit-error rate is minimized. The optimization process depends on the nature of the signal distortion. In classical information theory, it is assumed that the signal is distorted by the additive white Gaussian noise. In applications to watermarking, the code in one aspect of the invention is distorted by an audio encoder that is deterministic in nature. Therefore, if it is possible to invert the operation of the encoder, the system can recover the original signal and thus decode a watermark.

In one aspect of the invention, the distortion introduced by the audio encoder is treated as non-invertible. One of the reasons for that is the multiplicity of the encoders; the other reason is the desire to design algorithms that are robust against other types of distortion including an intentional distortion of the watermark. The error-control coding can be implemented using concatenated codes (similarly to the deep-space communication). The internal code can be implemented as described above. The outer code then adds redundancy to the sequence of encoded bits: if the message contains k information bits, the system adds n-k parity-check bits that depend on the information bits. The decoding in this case can be performed either simultaneously or in two phases: in the first phase the information and parity bits are estimated using the techniques described above regarding the retrieval process and in the second phase the information bits are re-estimated using the code parity bits. Both approaches are described below.

Convolutional codes add redundancy by inputting the information symbols into a finite-state machine whose output sequence contains more symbols than the input sequence. The codes can be described by the state-space equations $$S_{j+1}=AS_j+Bu_j, \quad y_j=CS_j+Du_j \qquad (12)$$

where A, B, C, and D are matrices, $u_j$ are the input symbols and $y_j$ are the encoder output symbols. Symbols $S_j$ are called the encoder states. The code redundancy is defined by the ratio of dimensions of the input and output symbols. For example, if $u_j$ are bits and $y_j$ are represented by two bits, the code rate is ½.

Figure 7:
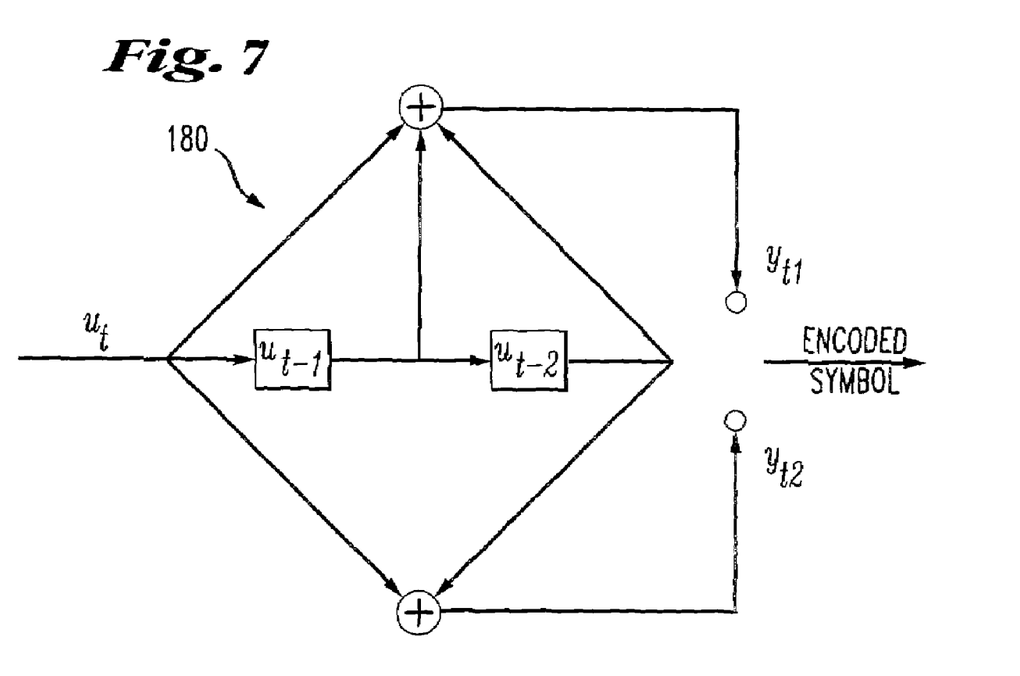
FIG. 7 illustrates a convolutional encoder.

Convolutional codes are usually implemented using shift registers. For example, a convolutional encoder 180 depicted in FIG. 7 is represented by the following equations:

$$S_{j+1} = \begin{pmatrix} 0 & 0 \\ 1 & 0 \end{pmatrix} S_j + \begin{pmatrix} 1 \\ 0 \end{pmatrix} u_j, \quad y_j = \begin{pmatrix} 1 & 1 \\ 0 & 1 \end{pmatrix} S_j + \begin{pmatrix} 1 \\ 1 \end{pmatrix} u_j$$

The state of this encoder is defined by the two consecutive input bits $S_j=[u_{j-1} u_{j-2}]$. Thus, by decoding the state sequence, the system can uniquely identify the encoder input bits.

The encoder output bits are embedded into the audio signal using the algorithm described above related to watermark embedding. Denote as $r_j$ the distorted encoded symbols in the retrieved signal. Assuming that the input bits and noise are i.i.d, it is observed that, according to Equation (12), the sequence $r_j$ is modeled by a Hidden Markov Model (HMM). Thus, the Viterbi algorithm is applied to decode the watermark. The algorithm is exactly the same as described above, the only difference is the number of states.

Because of the block structure of the proposed message embedding, it might be convenient to use block codes. Block codes can be used in concatenated codes to improve performance of the convolutional codes (as in deep-space communications). These codes are especially important to make watermark retrieval more robust in case of their intentional distortion. It is convenient to use a Reed-Solomon code as an outer code in the concatenated codes, because they are designed to correct bursts of errors produced by the inner Viterbi decoder when it selects an incorrect path.

The concatenation scheme can be applied when the inner short block code detects errors and marks the blocks with detected errors as erasures. In this case, the outer Reed-Solomon code corrects errors and erasures.

The block codes are most appropriate when watermarking is used to protect intellectual property. In this case, the system embeds a short message in all parts of the signal so that the more parts of the watermarked signal available, the more reliable the retrieved message. One method is to use the repetition code as an outer code. The same message is encoded by the inner code and embedded into different segments of the signal. After decoding the message using the inner code from each segment, the system compares the results and outputs the message using, for example, the majority logic decoding.

Test results are described next. A collection of nine segments of music was used to test the present invention. The results of these tests are not meant to be limiting in any way to the scope of the claims. Although the invention is not limited to audio signals, the tests were conducted using music. Included were various types of vocal, instrumental, and classical music. Each piece was about 12 seconds, which is long enough to cover distinctive characteristics of the music piece. The watermark is a randomly generated sequence of 0's and 1's.

An informal subjective listening test was conducted among expert listeners to verify the transparency of the algorithm. All the phase modulation in the test samples obeys the rule of Equation (2). However, by having m multiple barks carry one message bit, the dynamic range of the phase modulation can be increased in order to lower the error rate. The cases of m=2, 3 and 4 were tested, with corresponding phase dynamic ranges of +/−30°, +/−45° and +/−60°, respectively. Although they all followed the rule of Equation (2), the time window block ($N=2^{14}$) may not be long enough to make the time envelope change between blocks imperceptible. It was found that the watermarked audio signal was completely transparent for the case of +/−30° (m=2), and was nearly transparent for the +/−45° case (m=3). Some minor differences might be spotted by a sensitive expert listener for the +/−60° case (m=4). Therefore, m=2 and 3 are preferable options.

In order to test the robustness of the present invention, the watermarked signal was coded by MPEG AAC at 64 kb/s. Although the SNR between the coded and uncoded piece is very low (1–13 dB), the embedded watermark can be retrieved with very high accuracy. Table 1 lists the results of m=1, 2 and 3. Note that the error rate is reduced by increasing the dynamic range of the phase modulation, i.e., by having m barks carry one message bit.

TABLE 1

|  | Error Rate | Average Watermark Data Rate |
| --- | --- | --- |
| m = 1 | 2.81% | 56 b/s |
| m = 2 | 0.39% | 28 b/s |
| m = 3 | 0.19% | 19 b/s |

Since the type of AAC encoder is typically known during watermarking, the system can iteratively increase the redundancy and text-decode the message disclosed by the AAC coding until all the encoding errors are corrected. See Table 4 below for further information on correcting all encoding errors through increased iteration and redundancy. The redundancy process is applicable to both convolutional and block coding.

The redundancy effectively reduces the error rate by sacrificing the data rate of the watermark. Since low energy regions were skipped for carrying message bits, the watermark data rate varied for different types of music. Those shown in the table are the average rate for the 9 music clips under test. Their individual error rate, data rate and the type of the music are given in Table 2. The SNR is calculated between the watermarked signal and its AAC coded signal. The value m indicates the redundancy added by having m barks carry one message bit.

TABLE 2

| Music Type | SNR | m = 1 | m = 2 | M = 3 |
| --- | --- | --- | --- | --- |
| Guitar (Instrument) | 13 dB | 0.8% (53 b/s) | 0.0% (27 b/s) | 0.0% (18 b/s) |
| Rock | 18 dB | 2.7% (59 b/s) | 0.3% (30 b/s) | 0.5% (20 b/s) |
| Percussion | 1 dB | 7.4% (39 b/s) | 2.5% (20 b/s) | 0.0% (14 b/s) |
| Castanet (Instrument) | 9 dB | 2.8% (53 b/s) | 0.0% (27 b/s) | 0.7% (19 b/s) |
| Bagpipe (Instrument) | 13 dB | 2.4% (63 b/s) | 0.0% (32 b/s) | 0.0% (21 b/s) |
| Vocal | 15 dB | 3.7% (62 b/s) | 0.0% (31 b/s) | 0.0% (20 b/s) |
| Opera (Vocal) | 14 dB | 2.8% (61 b/s) | 0.0% (31 b/s) | 0.0% (21 b/s) |
| Harpsichord (Instrument) | 11 dB | 3.2% (61 b/s) | 0.6% (30 b/s) | 0.0% (20 b/s) |
| Terpsichore | 11 dB | 1.2% (58 b/s) | 0.7% (30 b/s) | 0.5% (20 b/s) |

The SNR between the watermarked signal and its AAC coded signal is also given in Table 2. Although the AAC coding process made the signal very noisy, the algorithm was shown to be very robust in retrieving the watermark. The error rates for m=2 and 3 are very low; most of them have a very low error rate at the data rate around 30 bits/sec.

The effectiveness of each tactic explained above relative to the discussion of retrieving the watermark was also tested. First of all, if the redundancy is added by simply repeating each message bit by m times instead of using m barks carrying one message bit, then the error rate will be more than doubled to 0.95% and 0.7% for m=2 and m=3, respectively. Table 3 shows how the error rate would be increased if one of the tactics used in the algorithm was not applied.

TABLE 3

| | (a) | (b) | (c) | (d) |
| --- | --- | --- | --- | --- |
| m = 2 | 1.5% | 1.3% | 4.2% | 1.1% |
| m = 3 | 1.2% | 0.6% | 4.5% | 1.3% |

The error rate resulted from: (a) without skipping low power regions for embedding message bits, (b) without jointly using R and L channels in cost calculation, Equation (11), (c) without using energy weights, and (d) not using L1 norm, but using L2 norm instead. Obviously, the energy weights play the most important role, but others also significantly reduce the error rate.

The remaining errors can be successfully corrected by applying error-control codes with an additional data rate reduction. The error-control codes are applied iteratively with increased redundancy in the following way. Usually, the watermarking can be used with a particular type of the AAC encoder. In this case, if, after test-decoding, the message has an error, the message is re-coded with the higher redundancy code until all the errors are corrected. As an example, consider (n,k,t) Bose-Chaudhuri-Hocquenghem (BCH) codes that are capable of correcting up to t bit errors in a block of n bits with k information bits and n-k redundant bits. See J. G. Proakis, *Digital Communications*, McGraw-Hill, 1983. Table 4 presents (n,k,t) BCH codes that correct all the errors in all the music clips.

TABLE 4

| | BCH Code | Data Rate |
| --- | --- | --- |
| m = 1 | (127,64,10) | 28 b/s |
| m = 2 | (127,106,3) | 22 b/s |
| m = 3 | (127,120,1) | 18 b/s |
| m = 1 w/o skipping low power | (127,8,31) | 4 b/s |
| m = 2 w/o skipping low power | (127,64,10) | 16 b/s |

These codes correct up to t bit errors in a block of n bits, k information bits and n-k redundant bits. Thus, the code rate is k/n and information rate reduction is (n-k)/n. It follows from Table 4 that, for the case of skipping low power regions, the system achieves better performance by using (127,64,10)-code (m=1 in Table 1) then using m=2 (Table 1) without the BCH code. On the other hand, skipping low power regions is more efficient than error-control coding: for m=2 case, the watermark data rate is 22 b/s if low power regions were skipped for embedding watermark, but it would be 16 b/s if not.

As discussed above, message bits have different error rates and the Viterbi algorithm produces error bursts that lead to a bursty nature of errors. Message bits interleaving reduces the error burstiness and improves the performance of the BCH code. By using a simple block interleaver, the system achieves even better performance than that shown in Table 4.

An algorithm for covert digital audio watermarking is presented. It embeds a watermark with a data rate of 20–30 b/s via perceptually insignificant long-term phase modulation. The watermarked signal is transparent with respect to the original signal. The watermark is made to be very difficult to recover without the "original" unmodulated signal. The algorithm is shown to be very robust for retrieving the embedded watermark. Even though the watermarked signal is significantly altered by noise, the embedded watermark is still retrievable with a very low error rate (0.19%). Using communication error-control coding can eliminate this remaining error. The error rate can also be reduced to 0% when applying the iterative process with increased redundancy discussed above.

Although the above description may contain specific details, they should not be construed as limiting the claims in any way. Other configurations of the described embodiments of the invention are part of the scope of this invention. For example, any signal that may receive a watermark, in addition to audio signals, may apply to the present invention. Further, although specific networks may be discussed herein when describing the invention, the embodiments of the invention are network independent. Accordingly, the appended claims and their legal equivalents should only define the invention, rather than any specific examples given.

We claim:

1. A method of generating a watermarked signal, the method comprising:
   (1) segmenting the signal into overlapping blocks using a window function;
   (2) for odd-numbered blocks, windowing each block using the window function; and
   (3) for even-numbered blocks:
      (a) transforming each block into a frequency domain;

(b) modulating a phase of each block in the frequency domain by constraining the phase change inside a critical band to prevent an audible envelope change in a time signal;

(c) transforming each modulated block in a time domain;

(d) windowing each block transformed into the time domain; and (4) overlap-adding each odd-numbered block with each even-numbered block to generate the watermarked signal.

2. The method of generating a watermarked signal of claim 1, the method further comprising, when modulating each block:

adding redundancy using error-correcting codes.

3. The method of generating a watermarked signal of claim 2, the method further comprising:

using convolutional codes when modulating each block.

4. The method of generating a watermarked signal of claim 3, the method further comprising:

using block code when modulating the phase of each block.

5. The method of generating a watermarked signal of claim 4, the method further comprising:

interleaving when modulating each block.

6. The method of generating a watermarked signal of claim 1, wherein modulating the phase of each even-numbered block is accomplished according to the following equation:

$$\overline{S}_k(f)=S_k(f)\cdot e^{j\Phi k(f)}, f=0,\ldots,N-1,$$

wherein f is in Hz, k is the number of the block, $\Phi_k(b) = a_{i-1}\varnothing(b-(i-1))+a_i\varnothing(b-1)$, for $i-1 \leq b \leq 1$, and $b=13$ arctan $(0.76f/1000)+3.5$ arctan$((f/77500)^2)$.

7. A method of adding message bits to a signal, the method comprising:

(1) segmenting the signal into overlapping blocks using a window function;

(2) for odd-numbered blocks:

(a) windowing each block using the window function; and (3) for even-numbered blocks:

(a) in a frequency domain, embedding a message bit into every integer bark-scale bin for each block, wherein a phase modulation for a k-th block is:

$\Phi_k(b)=\Sigma a_i\varnothing(b-i), 0.0\leq b \leq I$, for i=1 to I, where I is the maximum bark scale for embedding watermark;

(b) overlapping and adding adjacent window functions wherein the phase modulation for an i-th bark-scale bin is:

$\Phi_k(b)=a_{i-1}\varnothing(b-(i-1))+a_i\varnothing(b-i)$, for $i-1\leq b<i$;

(c) modulating a phase of each block on a bark scale, wherein each integer bark scale bin carries a message bit;

(d) transforming each modulated block in a time domain;

(e) windowing each block transformed into the time domain; and (4) overlap-adding each odd-numbered block with each even-numbered block to generate a watermarked signal.

8. The method of adding message bits to a signal of claim 7, wherein embedding a message bit into each bark scale bin of the block further comprises representing each message bit by a phase window function centered at the end of a corresponding bark band and spanning two adjacent barks.

9. The method of adding message bits to a signal of claim 7, wherein modulating the phase of each block is accomplished according to the following:

$$\overline{S}_k(f)=S_k(f)\cdot e^{j\Phi k(f)}, f=0,\ldots,N-1, \text{ where f is the frequency in Hz.}$$

10. A method of generating a watermarked signal from a signal, the method comprising:

(1) segmenting the signal into overlapping blocks $s_k(n)$, n=0, ..., N-1 using a window function;

(2) for odd-numbered blocks:

(a) windowing each block using the window function to generate blocks $s^*_k(n)$; and (3) for even-numbered blocks:

(a) in a frequency domain, embedding a message bit into every integer bark-scale bin for each even-numbered block $S_k(f)$, wherein a phase modulation for a k-th block is:

$\Phi_k(b)=\Sigma a_i\varnothing(b-i), 0.0\leq b \leq I$, where $b=13$ arctan $(0.76f/1000)+3.5$ arctan$((f/7500)^2)$ and where the resulting signal for each even-numbered block is:

$$\overline{S}_k(f)=S_k(f)\cdot e^{j\Phi k(f)}, f=0,\ldots,N-1;$$

(b) in a time domain, windowing the phase modulated block to generate $\overline{s}^*_k(n)$; and (4) overlapping and adding $\overline{s}^*_k(n)$ and $s^*_k(n)$.

11. The method of generating a watermarked signal of claim 10, wherein the signal is an audio signal.

12. The method of generating a watermarked signal of claim 10, further comprising repeating each message bit for redundancy.

13. A method of generating a watermarked signal from a signal, the method comprising:

(1) windowing the signal into overlapping windowed blocks Sk(n), n=0, ..., N-1 using a window function;

(2) windowing each odd block to generate $s^*_k(n)$, n=0, ..., N-1, k=1, 3 ... odd numbers;

(3) for each even block $s_k(n)$, n=0, ..., N-1, k=0, 2 ... even numbers:

(a) transforming $s_k(n)$ into a frequency domain as $S_k(f)$;

(b) phase modulating $s_k(f)$ in the frequency domain to generate $\overline{S}_k(f)$ and applying a message bit to the integer bark scale associated with each block $S_k(f)$, wherein the phase modulation for a k-th block is:

$\Phi_k(b)=\Sigma a_i\varnothing(b-i), 0.0\leq b \leq I$, where I is a maximum bark scale for embedding the watermark;

(c) transforming $\overline{S}_k(f)$ into a time domain to generate $\overline{s}_k(n)$;

(d) windowing $\overline{s}_k(n)$ in the time domain to generate $\overline{s}^*_k(n)$; and (4) overlap-adding the odd and even blocks to form the watermarked signal.

14. The method of claim 13, wherein phase modulating $S_k(f)$ in the frequency domain to generate $\overline{S}_k(f)$ further comprises complying with the following rule:

$|(d\Phi/d\ b)|<30°$, where $\Phi$ is the signal phase, and b is the bark scale.

15. The method of claim 13, wherein N is at least $2^{14}$.

16. The method of claim 15, wherein, for the even blocks, phase modulating $S_k(f)$ comprises generating $\overline{S}_k(f)$ according to the following:

$$\overline{S}_k(f)=S_k(f)\cdot e^{j\Phi k(f)}, f=0,\ldots,N-1, \text{ where is in Hz.}$$

17. The method of claim 13, wherein the relation of f to the bark scale is $b=13 \arctan(0.76f/1000)+3.5 \arctan((f/7500)^2)$.

18. The method of claim 13, further comprising representing each message bit by a phase window function centered at the end of a corresponding bark band and that spans two adjacent bark bands, the phase window function being defined as:

$\Phi(b)=\sin^2(\pi(b+1)/2), -1.0 \leq b \leq 1.0$.

19. The method of claim 13, further comprising adding and overlapping adjacent window functions to generate a final phase modulation in the i-th bark scale bin according to:

$\Phi_k(b)=a_{i-1}\phi(b-(i-1))+a_i\phi(b-1)$, for $i-1 \leq b \leq i$.

20. The method of claim 13, further comprising modifying the phases of the k-th audio block according to:

$\Phi_k(b)=\Sigma a_i\phi(b-i), 0.0 \leq b \leq I$.

21. A method of generating a watermarked signal from a signal, the method comprising:
   (1) segmenting the signal into overlapping blocks using a window function;
   (2) for odd-numbered blocks:
      (a) windowing each block using the window function to generate odd-numbered windowed blocks; and
   (3) for even-numbered blocks:
      (a) in a frequency domain, embedding a message bit into every integer bark-scale bin for each even-numbered block, wherein the phase modulation for a k-th block is $\Phi_k(b)=\Sigma a_i\phi(b-i)$ and $|(d\phi/d\, b)|<30°$, where $\phi$ is the signal phase, and b is the bark scale; and
      (b) in a time domain, windowing the phase-modulated block; and
   (4) overlapping and adding the odd-numbered windowed blocks and even-numbered phase-modulated blocks.

22. The method of generating a watermarked signal of claim 21, wherein the signal is an audio signal.

23. The method of generating a watermarked signal of claim 21, further comprising repeating each message bit for redundancy.

24. The method of generating a watermarked signal of claim 21, wherein for the phase modulation of the k-th block $\Phi_k(b)=\Sigma a_i\phi(b-i)$, and $0.0 \leq b \leq I$.

25. A method of generating a watermarked signal from a signal that is segmented into overlapping blocks using a window function and where odd-numbered blocks are windowed using the window function, the method comprising, for even-numbered blocks:
   (a) determining whether an audibility rule is met; and
   (b) if the audibility rule is met, embedding a message bit into every integer bark-scale bin for each even-numbered block, wherein if the audibility rule is met, the phase modulation for the k-th even-numbered block is $\Phi_k(b)=\Sigma a_i\phi(b-i)$, where $\phi$ is the signal phase, and b is the bark scale.

26. The method of generating a watermarked signal of claim 25, wherein the audibility rule is $|(d\phi/d\, b)|<30°$.

27. The method of generating a watermarked signal of claim 26, further comprising:
   windowing each phase-modulated block; and
   overlapping and adding the odd-numbered windowed blocks and even-numbered phase-modulated blocks to generate the watermarked signal.

28. A method of generating a watermarked signal from a signal that is segmented into overlapping blocks using a window function, the method associated with using the segmented blocks to perform phase modulation of even-numbered blocks and overlap-adding the even-numbered blocks and odd-numbered blocks to generate the watermarked signal, the method comprising:
   (a) determining whether an audibility rule is met; and
   (b) if the audibility rule is met, embedding a message bit into every integer bark-scale bin for each even-numbered block, wherein if the audibility rule is met, the phase modulation for the k-th even-numbered block is $\Phi_k(b)=\Sigma a_i\phi(b-i)$, where $\phi$ is the signal phase, and b is the bark scale.

29. The method of generating a watermarked signal of claim 28, wherein the audibility rule is $|(d\phi/d\, b)|<30°$.

* * * * *